United States Patent
Ou et al.

(10) Patent No.: US 9,438,127 B2
(45) Date of Patent: Sep. 6, 2016

(54) REVERSE CURRENT CONTROL FOR AN ISOLATED POWER SUPPLY HAVING SYNCHRONOUS RECTIFIERS

(71) Applicant: ANALOG DEVICES TECHNOLOGY, Hamilton (BM)

(72) Inventors: Yingyang Ou, Shenzhen (CN); Qingyi Huang, Shenzhen (CN); Renjian Xie, Shenzhen (CN); Ling Ren, Shenzhen (CN)

(73) Assignee: Analog Devices Global, Hamilton (BM)

( * ) Notice: Subject to any disclaimer, the term of this patent is extended or adjusted under 35 U.S.C. 154(b) by 335 days.

(21) Appl. No.: 13/947,820

(22) Filed: Jul. 22, 2013

(65) Prior Publication Data

US 2014/0254206 A1    Sep. 11, 2014

Related U.S. Application Data

(60) Provisional application No. 61/776,630, filed on Mar. 11, 2013.

(51) Int. Cl.
*H02M 3/335* (2006.01)

(52) U.S. Cl.
CPC ....... *H02M 3/33592* (2013.01); *Y02B 70/1475* (2013.01)

(58) Field of Classification Search
CPC ......... H02M 3/33507; H02M 3/3376; H02M 3/33569; H02M 3/33546; H02M 2001/0058; H02M 3/33592; Y02B 70/1475
USPC ...... 363/21.01, 17, 21.07, 22, 24, 50, 56.01, 363/56.02, 58, 95, 97
See application file for complete search history.

(56) References Cited

U.S. PATENT DOCUMENTS

| | | | |
|---|---|---|---|
| 5,872,705 A * | 2/1999 | Loftus et al. | 363/21.06 |
| 7,394,633 B2 | 7/2008 | Sasitornwannakul et al. | |
| 7,589,982 B2 * | 9/2009 | Wang | H02M 3/33592 363/21.06 |
| 7,616,464 B2 * | 11/2009 | Phadke | H02M 3/33576 323/285 |
| 8,259,470 B2 * | 9/2012 | Fan | H02M 3/33515 363/21.06 |
| 2004/0052100 A1 * | 3/2004 | Huang | H02M 1/38 363/125 |
| 2007/0165429 A1 * | 7/2007 | Selvaraju | H02M 3/33592 363/53 |
| 2009/0201000 A1 * | 8/2009 | Kojima | H02M 3/1588 323/282 |
| 2011/0317453 A1 | 12/2011 | Fan et al. | |
| 2012/0026756 A1 | 2/2012 | Fan et al. | |

* cited by examiner

*Primary Examiner* — Timothy J Dole
*Assistant Examiner* — Htet Z Kyaw
(74) *Attorney, Agent, or Firm* — Patent Capital Group

(57) ABSTRACT

In certain example embodiments, a system is provided that includes a circuit. The system also includes a reverse current control module that provides an isolated power supply in order to protect one or more devices in a power chain during one or more testing activities having one or more requirements.

24 Claims, 9 Drawing Sheets ial circuit, or a software control. The reverse current control module can be integrated with the SR control module or be a separated functional module.

REVERSE CURRENT CONTROL FOR AN ISOLATED POWER SUPPLY HAVING SYNCHRONOUS RECTIFIERS

PRIORITY DATA

This application is a non-provisional of U.S. Provisional Patent Application Ser. No. 61/776,630, filed Mar. 11, 2013, which is hereby incorporated by reference in its entirety.

TECHNICAL FIELD

This disclosure relates in general to the field of power supplies and, more particularly, to controlling a reverse current in a power supply having synchronous rectifiers.

BACKGROUND OF THE DISCLOSURE

Transformers isolate an output from an input. The side that is connected with the input is designated as the primary side, and the side that is connected with the output is designated as the secondary side.

To increase power density and efficiency in supplying power from the input to the output, semiconductor switches such as Metal-Oxide-Semiconductor Field Effect Transistors (MOSFETs) and Insulated Gate Bipolar Translators (IGBTs) are employed as synchronous rectifiers. Specifically, the semiconductor switches are able to replace rectifying diodes, because the semiconductor switches have a tiny conduction resistance when they are driven "ON." Compared with the diodes, the semiconductor synchronous rectifiers can increase efficiency significantly and, further, reduce heat dissipation.

DETAILED DESCRIPTION OF EXAMPLE EMBODIMENTS

Overview of the Disclosure

Figure 1:
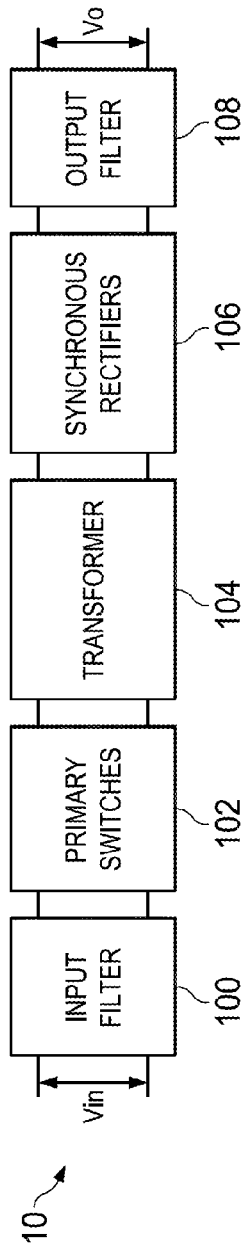
FIG. 1 illustrates an example of a conventional isolated power supply having synchronous rectifiers.

An objective of this disclosure is to provide an isolated power supply using a reverse current control module for protecting devices in a power chain in tests that have detailed requirements on an input voltage, such as an input dip, interrupt, or short-circuited tests in accordance with the IEC61000-4-11 standard, etc.

This isolated power supply includes an input power source that provides energy to a load, an input filter that decouples ripple interference from the input power source, one or several switches located on a primary side to invert an input DC voltage into an AC voltage, a transformer that isolates an input and an output, one or more synchronous rectifiers that rectify the AC voltage back to a DC voltage, an output filter that smooths the DC voltage rectified by the synchronous rectifiers, and a synchronous rectifiers (SR) control module that turns off the synchronous rectifiers. The reverse current control module senses the input voltage on the primary side and the output voltage on the secondary side and generates a signal when the sensed input voltage is lower than a threshold.

The reverse current control module can include an input voltage detector, an output voltage detector, and a compare module that compares one or more voltages. The input voltage detector can have an input for an input voltage sensing and an output to the compare module. The output voltage detector may have an input for an output voltage sensing and an output to the compare module.

The compare module can have two inputs from the input voltage detector and the output voltage detector and can calculate a threshold based on an output voltage and at least one other parameter. In one embodiment, the compare module also compares the input voltage with a threshold and generates a signal when the input voltage is lower than that threshold. This signal can be transmitted to the SR control module. The SR control module can receive an input of a signal sent from the compare module and turn off one or more of the synchronous rectifiers. Further, the SR control module can disable one or more driving signals for one or more synchronous rectifiers.

The input voltage detector can sense a voltage on both a primary side and a secondary side that reflects an input voltage or that has relationship with the input voltage. The compare module can perform a compensation for both an input voltage and an output voltage to calculate a correct input and output voltage value. The compare module can calculate a voltage threshold dynamically or set the threshold as a predetermined value.

The power supply can include a first block that decouples noise, and a second block that attains a certain delay time. At least some portions of the power supply maintain an input signal and an output signal for a predetermined time.

The reverse current control module and the SR control module can be implemented as an analog circuit, a digital circuit, a hybrid circuit, or software executed in a memory or in conjunction with a processor.

In one embodiment, the power supply includes an input power source and an input voltage detector. The reverse current control module includes a compare module that senses an input voltage on a primary side and generates a signal to be sent to a synchronous rectifier when a sensed input voltage is lower than a predetermined threshold.

An additional objective of this disclosure is to provide a method including sending a first signal from a reverse current control module to an SR control module; and sending a second signal from the SR control module to a synchronous rectifier, in response to the first signal, to protect one or more devices in a power chain during a short-circuit on a primary side of a transformer.

Example Embodiments

For purposes of illustrating the techniques and features of the present disclosure, it is important to understand how previous architectures have failed in certain respects. The following foundational information may be viewed as a basis from which the present disclosure may be properly explained. Such information is offered earnestly for purposes of explanation only and, accordingly, should not be construed in any way to limit the broad scope of the present disclosure and its potential applications. FIG. 1 shows an example of a conventional representative diagram of an isolated power supply 10 having synchronous rectifiers. The isolated power supply 10 is made up of an input filter 100, primary switches 102, a transformer 104, synchronous rectifiers 106, and an output filter 108. The input filter 100 decouples ripple interference from an external direct current (DC) source V. The primary switches 102 invert this DC voltage into a periodic alternating current (AC) voltage. The transformer 104 transfers this AC voltage, which is applied across its terminals on the primary side, to its terminals on the secondary side. The synchronous rectifiers 106 rectify this AC voltage on the secondary side into a DC voltage again, and the output filter 108 smooths this voltage. During normal operation, the input Vin connects to the external DC source, the output Vo connects to a load, and the power supply delivers energy from the input to the output.

Semiconductor switches allow current to flow bidirectionally. During input voltage dip or interrupt tests, the input voltage will decrease sharply from a normal voltage level to a low voltage level in a very short time. As the input voltage changes to this lower value, there is insufficient energy delivered from the input to the output. Accordingly, the energy stored in the output filter 108 discharges through a circuit loop formed of the output filter 108, the synchronous rectifiers 106, the transformer 104, and the primary switches 102. Thus, a large current stemming from the output to the input appears. This large current may damage the internal components of the power supply, without the protection of a safeguard device.

U.S. Pat. No. 7,394,633 relates to this short-circuited input issue. In that document, a MOSFET is added between the external power source and the input filter. When the power supply works normally, energy is transferred from the input to the output, and the MOSFET is "ON" and operates as a tiny conduction resistor. Once the input terminals are shorted, a reverse current arises. A negative voltage across a drain and a source of this MOSFET caused by the reverse current is then sensed. This negative voltage signal will be amplified to turn off this MOSFET. However, that document requires an additional power switch and a control circuit. If the short-circuit is located after the input filter, the teachings of that document still cannot prevent the reverse current flowing from the output to the shorted input.

US Patent Application Publication Nos. 2011/0317453 and 2012/0026756 address reverse current issues. These documents use a circuit to sense a voltage signal from a surge reverse current appearing on the primary side. When the sensed voltage exceeds a predetermined threshold, a signal is generated to turn off the synchronous rectifiers. A high speed, precise operation amplifier and a sensing resistor are required in this circuit, which might lower the efficiency and increase the circuit cost.

U.S. Pat. No. 7,616,464 describes a technique for a power supply that includes an output inductor in the output filter. In that document, average voltages, referenced to ground, of the input and output of the output inductor are sensed. When the average voltage of the input of the output inductor is lower than the average voltage of the output thereof, a signal is generated to turn off the synchronous rectifiers.

Thus, one objective of this disclosure is to provide a reverse current control module for protecting devices in a power chain in tests that have detailed requirements on an input voltage, such as an input dip, interrupt, or short-circuited tests (e.g., in accordance with the IEC61000-4-11 standard), etc.

Figure 2A:
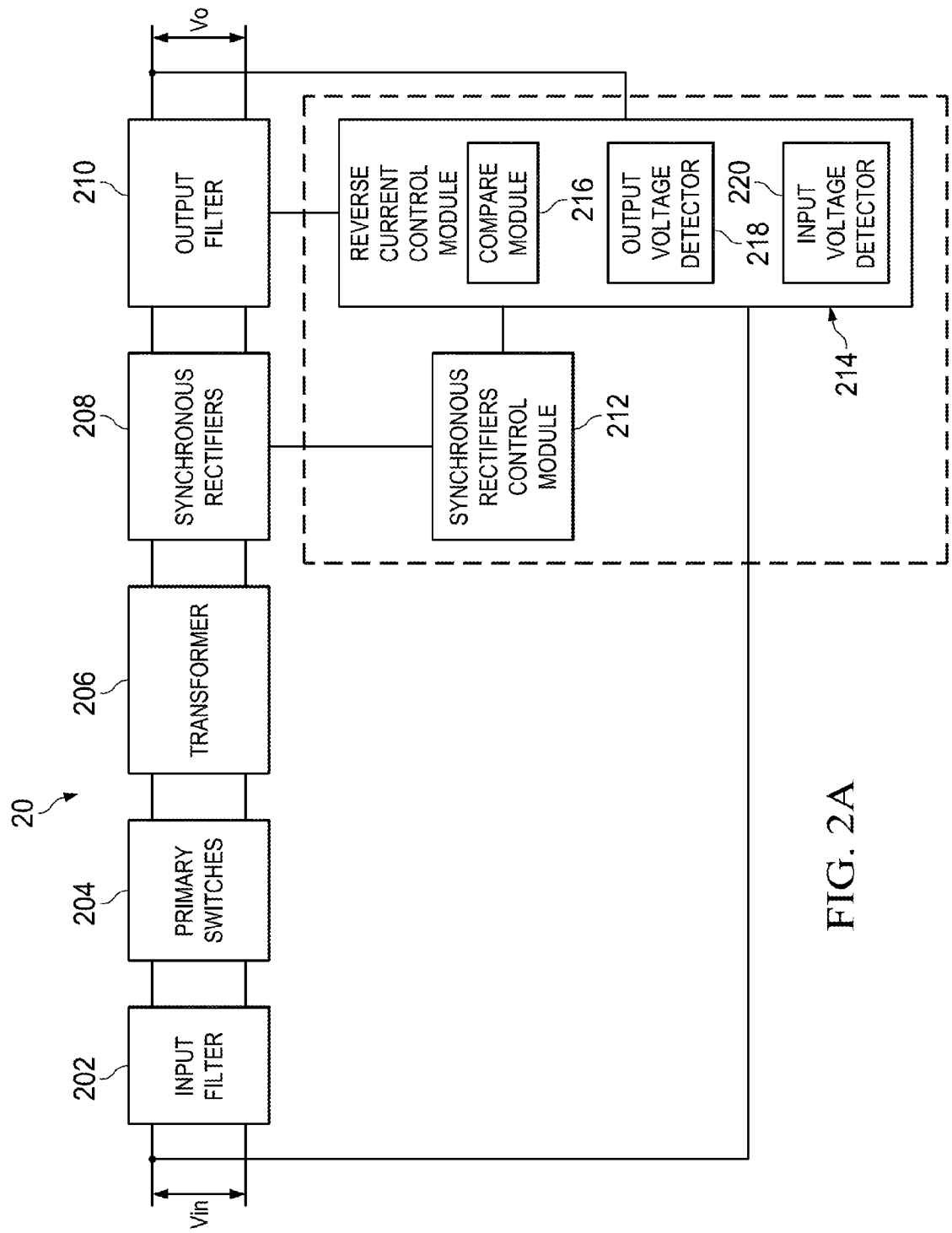
FIGS. 2A-2B illustrate exemplary isolated power supplies with reverse current control modules in accordance with example embodiments of the present disclosure.
Figure 2B:
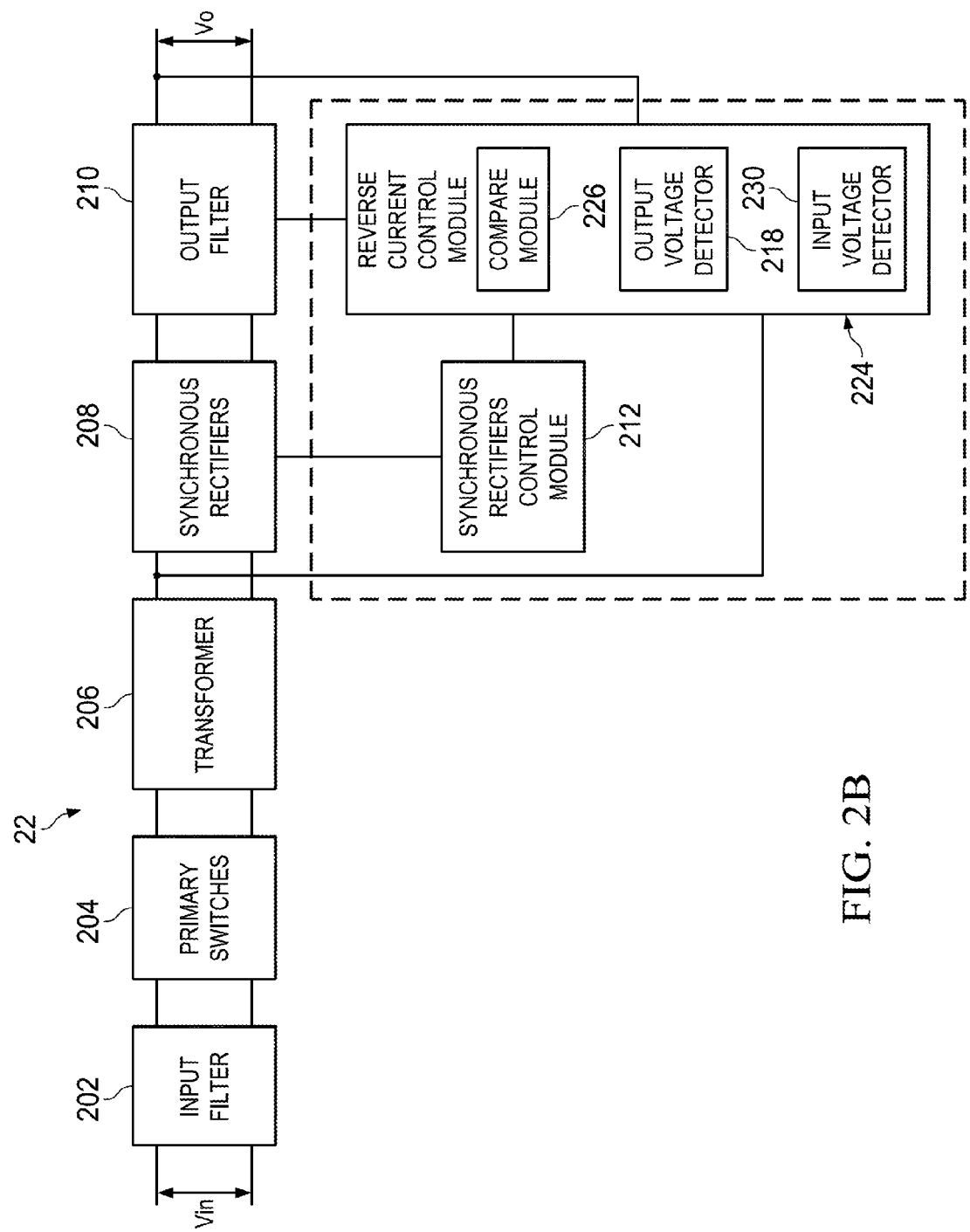

FIGS. 2A and 2B illustrate isolated power supplies 20, 22 with synchronous rectifiers 208 and reverse current control modules 214, 224. The isolated power supplies 20, 22 each include an input filter 202, one or several primary switches 204, a transformer 206, synchronous rectifiers 208, an output filter 210, an SR control module 212, and an output voltage detector 218. The input filter 202 decouples ripple interference from an external direct current (DC) source $V_{in}$. The primary switches 204 invert this DC voltage into a periodic alternating current (AC) voltage. The transformer 206 transfers this AC voltage, which is applied across its terminals on the primary side, to its terminals on the secondary side. The synchronous rectifiers 208 rectify this AC voltage on the secondary side back into a DC voltage, and the output filter 210 smooths this DC voltage. The SR control module 212 turns off the synchronous rectifiers 208. The output voltage detector 218 senses the output voltage Vo on the secondary side.

In FIG. 2A, the reverse current control module 214 includes a compare module 216, the output voltage detector 218, and an input voltage detector 220. The input voltage detector 220 senses the input voltage Vin on the primary side. The compare module 216 compares the input voltage Vin with a threshold on the primary side. Once the input voltage Vin is lower than this threshold, a signal is sent out to the synchronous rectifiers (SR) control module 212. There may be an isolated unit (not shown) for transmitting this signal from the primary side to the secondary side. The sensed input voltage Vin can also be transmitted to the secondary side in advance via an isolated unit (not shown) to make the threshold comparison on the secondary side. After receiving the signal sent from compare module 216, the SR control module 212 disables the signals applied to the synchronous rectifiers 208.

FIG. 2B illustrates another possible implementation in reverse current control module 224. In some applications, there is a voltage pulse train whose voltage plateau has a relationship with the input voltage. The input voltage detector 230 senses this voltage plateau and outputs this voltage information to compare module 226. The compare module 226 can compensate this voltage information to achieve a correct input voltage value. Then, the compare module 226 compares the sensed input voltage value or the compensated input voltage value with a threshold. Once the sensed input voltage value or the compensated input voltage value is lower than this threshold, a signal is sent out to the SR control module 212. After receiving the signal sent from the reverse current control module 224, the SR control module 212 disables the signals applied to the synchronous rectifiers 208.

Figure 3:
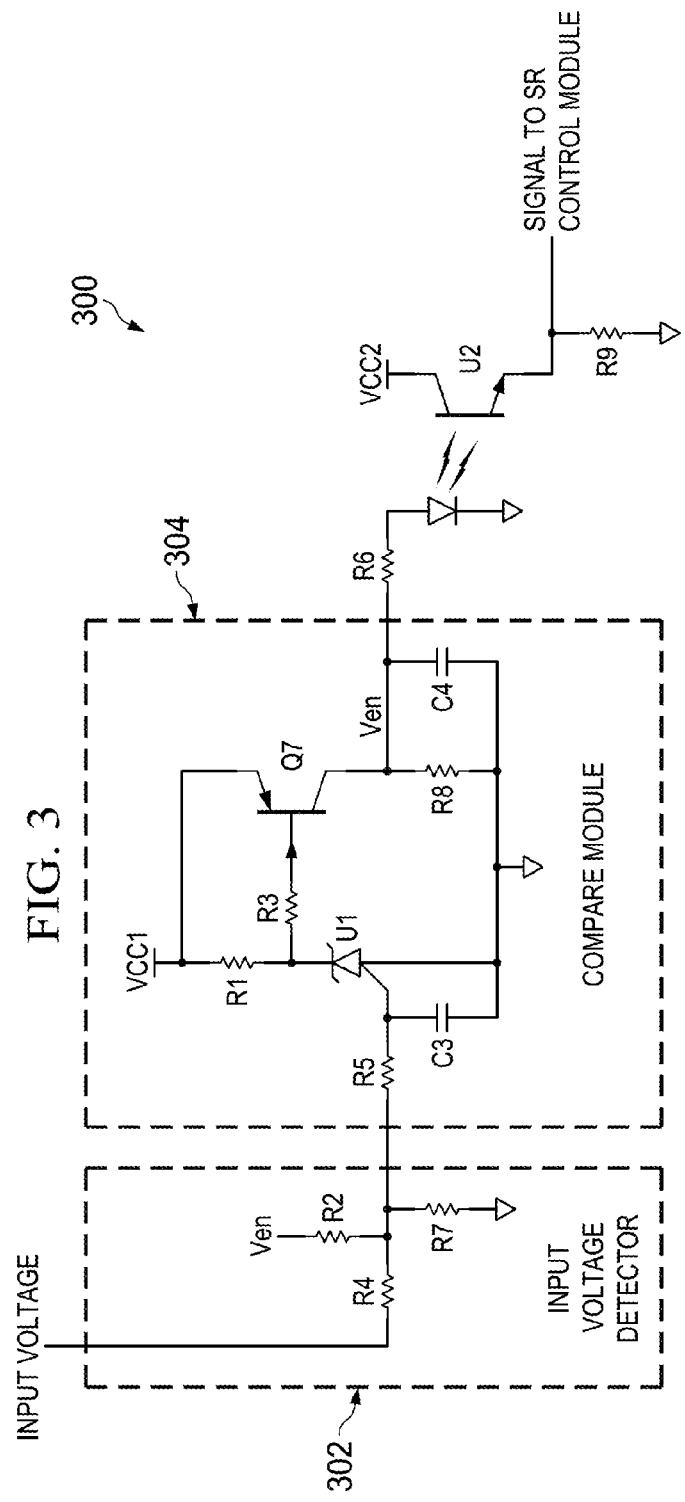
FIG. 3 illustrates a schematic circuit of a reverse current control module in accordance with one example embodiment of the present disclosure.

As mentioned above, a reverse current control module 214, 224 achieves a correct input voltage, compares the input voltage with a threshold, and generates a signal for the SR control module 212. FIG. 3 depicts a detailed schematic of a reverse current control module 300 having a predetermined threshold in compare module 304. As illustrated in FIG. 3, the reverse current control module 300 also has an input voltage detector 302 including resistors R2, R4, and R7. One end of resistor R4 receives an input voltage, and the other end connects to an output node of input voltage detector 302. This output node is also connected to ends of resistors R2 and R7 and an input of compare module 304. The other end of R2 connects to voltage Ven. The other end of resistor R7 connects to a reference, such as ground.

The compare module 304 includes resistors R1, R3, R5, and R8, capacitors C3 and C4, zener diode U1, and transistor Q7. An input end of resistor R5 connects to the aforementioned output node of the input voltage detector 302. The other end of the resistor R5 is connected to the capacitor C3 and zener diode U1. The other ends of capacitor C3 and zener diode U1 connect to the reference. The output of zener diode U1 connects to ends of resistors R1 and R3. The other end of resistor R1 connects to VCC1. The other end of resistor R3 connects to the base of transistor Q7. The emitter of transistor Q7 connects to VCC1. The collector of transistor Q7 connects to an output node of compare module 304. This output node is also connected to ends of resistor R8 and capacitor C4. The other ends of resistor R8 and capacitor C4 connect to the reference.

The output node of compare module 304 connects to one end of resistor R6. The other end of resistor R6 is connected to an opto-coupler U2.

The light output of the opto-coupler U2 is received at the base of a phototransistor. The collector of the phototransistor is connected to VCC2. The emitter of the phototransistor outputs to a node that carries the signal to the SR control module 212. This node is also connected to resistor R9 to ground.

Figure 4C:
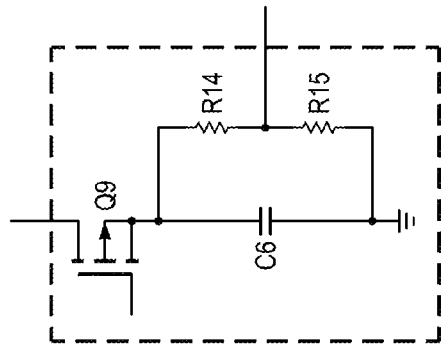
FIGS. 4A-4C illustrate three embodiments of the input voltage detector in accordance with example embodiments of the present disclosure.
Figure 4B:
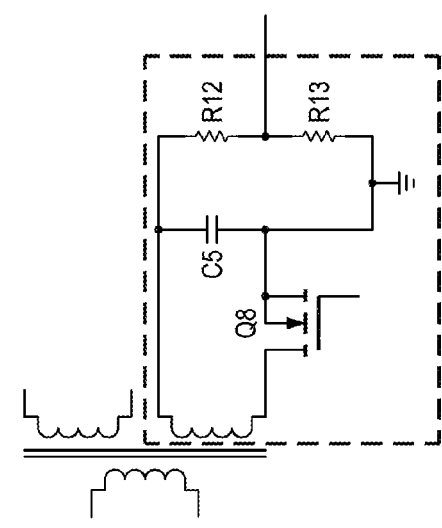
Figure 4A:
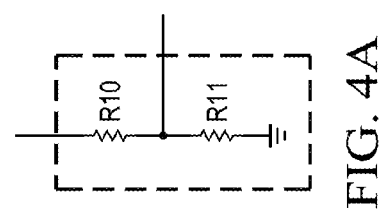

FIGS. 4A-4C illustrate three embodiments of the input voltage detector 220, 230 implemented by an example hardware circuit. FIG. 4A illustrates an example voltage divider, whose output voltage is proportional to the input voltage. As shown in FIG. 4A, an input is received at one end of resistor R10, and the other end of resistor R10 is connected to grounded resistor R11. The output of the voltage divider is taken at the node between resistors R10 and R11.

FIGS. 4B and 4C illustrate active clamp circuits. FIG. 4B shows a transformer with one primary winding and two secondary windings. One end of one of the secondary windings is connected to one end of a capacitor C5 and a resistor R12. The other end of that secondary winding is connected to a drain of a transistor Q8. The body of Q8 and the source of Q8 are connected to the other end of capacitor C5. Further, the other end of resistor R12 is connected to one end of resistor R13. The other end of resistor R13 is connected to the other end of capacitor C5 and is also grounded. The output is taken at the node between resistors R12 and R13.

FIG. 4C shows an input voltage detector that receives an input at a drain of transistor Q9. The body and source of transistor Q9 are attached to one end of capacitor C6 and resistor R14. The other end of resistor R14 is connected to one end of resistor R15. The other end of capacitor C6 and resistor R15 are grounded. The output is taken at the node between resistors R14 and R15.

The voltage of capacitor C5 in FIG. 4B and C6 in FIG. 4C can be clamped to the voltage plateau across the transformer winding that has a relationship with the input voltage. Thus, the circuit of FIG. 4B uses an additional winding to sense the input voltage; the circuit of FIG. 4C senses the voltage pulse train in the main stage directly.

Figure 5C:
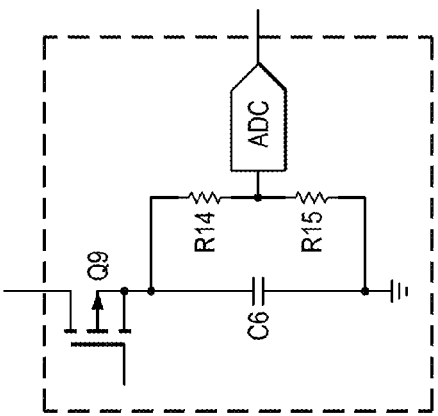
FIGS. 5A-5C illustrate three embodiments of the input voltage detector for digital control in accordance with example embodiments of the present disclosure.
Figure 5B:
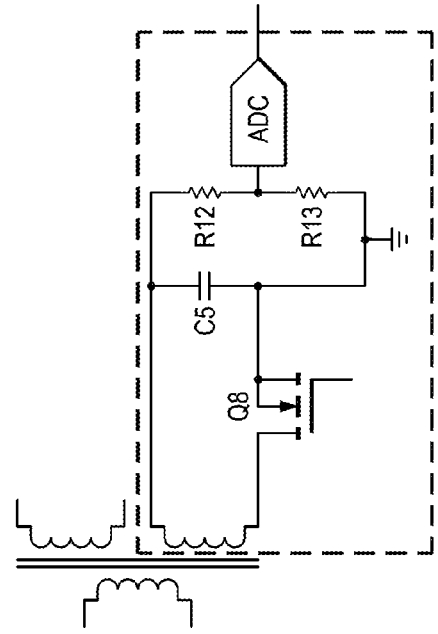
Figure 5A:
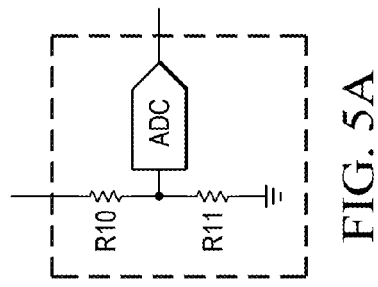

Since the reverse current control module 214, 224 can also be implemented by software stored in a memory or executed by a processor, the input voltage detector 220, 230 can sense the voltage and output data representing that voltage to the compare module, as shown in FIG. 5. As illustrated in FIG. 5, an analog-to-digital converter (ADC) samples the output voltage of the input voltage detector and transmits the sampled data to the compare module 216, 226.

The memory storing the reverse current control module can be a non-transitory medium, such as a random access memory (RAM) or read-only memory (ROM), compact disc (CD), digital versatile disc (BD), or Blu-ray disc (BD). The memory can also be a transitory medium, such as software itself or a propagating wave. Further, such a processor is an example of a control means.

The output voltage detector 218 senses the output voltage Vo of the output filter 210. The output voltage detector 218 can be implemented with the voltage divider shown in FIGS. 4A and 5A.

The compare module 216, 226 receives the sensed input voltage from the input voltage detector 220, 230 and compares the sensed input voltage with a threshold. A signal or flag can be generated when the sensed input voltage is lower than that threshold. The basic diagram of the compare module 216, 226 is shown in FIG. 6.

Figure 6:
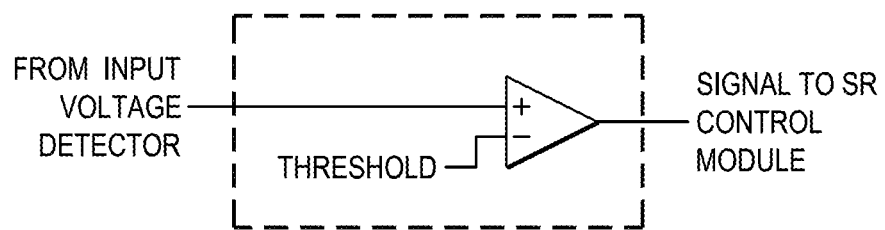
FIG. 6 illustrates a basic diagram of a compare module in accordance with one example embodiment of the present disclosure.

FIG. 6 shows an embodiment of the compare module 216, 226 implementing an operational amplifier. The non-inverting input of the operational amplifier receives a signal from the input voltage detector 220, 230. The inverting input of the operational amplifier is connected to the aforementioned threshold. The output of the operational amplifier carries a signal to the SR control module 212.

Figure 7:
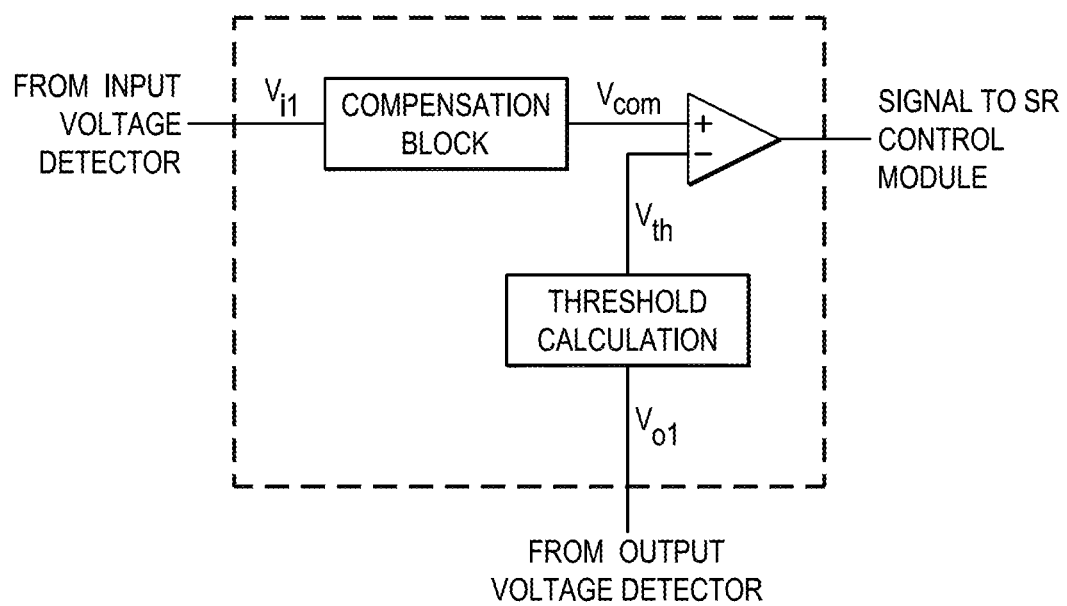
FIG. 7 illustrates a diagram of a compare module with input compensation and threshold calculation in accordance with one example embodiment of the present disclosure.

The threshold used by the compare module 216, 226 can be predetermined or calculated from an output voltage and other parameters (shown below). The input voltage can be compensated by the compare module 226 to achieve a more accurate value when the sensed point for the input voltage is not located on the input terminals. For example, when the sensed point is located on the output of the secondary winding of the transformer, a conduction resistor between the input terminal and the sensed point should be considered. Therefore, a compensation block can be added before the input voltage is compared with the threshold, as shown in FIG. 7. In the illustrated embodiment, the compensation block is added between the signal from the input voltage detector 220, 230 and the non-inverting input of the operational amplifier. In addition, the inverting input of the operational amplifier receives Vth from a threshold calculation block. This threshold calculation block receives an output voltage Vo1 from the output voltage detector 218.

This compensation block can be implemented by the equation below:

$$V_{com} = k_1 \times V_{i1} + k_2$$

where $V_{com}$ is the output of the compensation block, $V_{i1}$ is the output of the input voltage detector, $k_1$ is a fixed value or a variable value, and $k_2$ is a fixed value or a variable value.

The operational amplifier generates a signal to turn off the synchronous rectifiers 106 so that the output is unable to discharge energy via the synchronous rectifiers 106.

If the output voltage does not vary in a very large range, the threshold for the comparison can be a predetermined value $V_{pre}$. That is, the value of the threshold $V_{th}$ is given by:

$$V_{th}=V_{pre}$$

If the output voltage varies in a very large range, the threshold for the comparison can follow the change in the output voltage. The $V_{th}$ can be given by:

$$V_{th}=V_{o1}\times m\pm n$$

where m, n are fixed values, and $V_{o1}$ is the output from the output voltage detector 218. In one example, m is the windings turn ratio of the transformer 206 or the product of the windings turn ration and a coefficient. In one embodiment, n is a fixed value to give a certain offset to the threshold.

Implementations of compensating the input voltage and calculating the threshold are not limited to those above. Similarly, the compare module 216, 226 is not limited to being implemented by a hardware circuit but can also be implemented in software stored in a memory or executed by a processor, or in any hybrid circuit. The memory can be a non-transitory medium, such as a random access memory (RAM) or read-only memory (ROM), compact disc (CD), digital versatile disc (BD), or Blu-ray disc (BD). The memory can also be a transitory medium, such as software itself or a propagating wave. The structures of a processor and of the operational amplifier are examples of a comparing means.

Figure 8A:
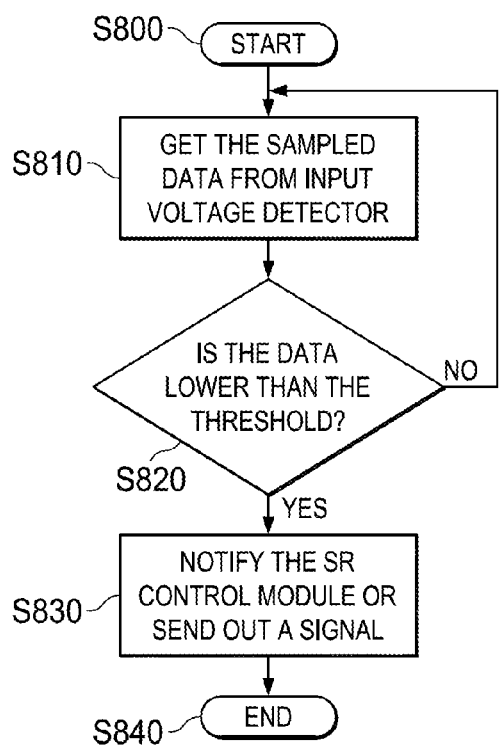
FIGS. 8A-8B illustrate flowcharts of a compare module executed in software in accordance with example embodiments of the present disclosure.
Figure 8B:
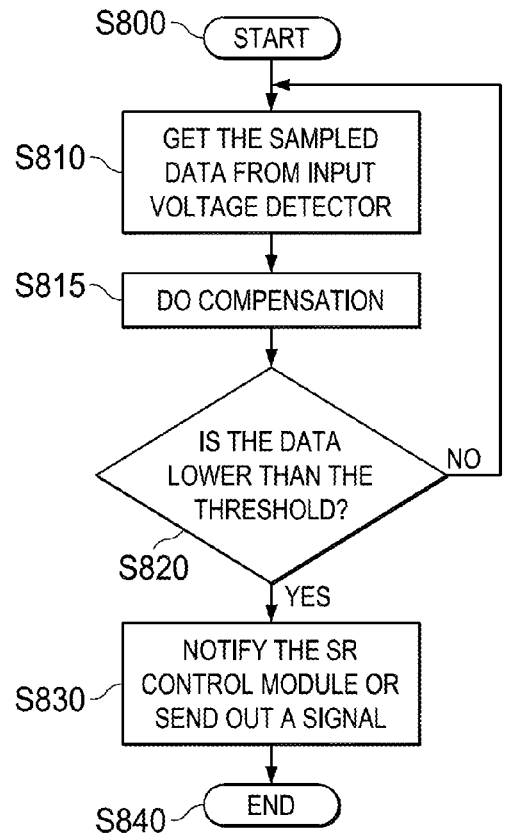

FIGS. 8A and 8B illustrate two possible flowcharts of the operations of compare module 216, 226. The possible threshold calculation is not shown in these examples.

In FIG. 8A, the operations start at S800 and proceed to S810. At S810, the compare module receives sampled data from the input voltage detector 220. At S820, the compare module determines whether the sampled data is lower than the threshold. If the sampled data is not lower than the threshold, then the operations return to S810. If the sampled data is lower than the threshold, then the SR control module 212 is notified, or a signal is sent out, at S830. The operations end at S840.

In FIG. 8B, the operations start at S800 and proceed to S810. At S810, the compare module receives sampled data from the input voltage detector 230. At S815, compensation is performed as discussed previously. At S820, the compare module determines whether the sampled data is lower than the threshold. If the sampled data is not lower than the threshold, then the operations return to S810. If the sampled data is lower than the threshold, then the SR control module 212 is notified, or a signal is sent out, at S830. The operations end at S840.

The SR control module 212 includes all of the control logic for the synchronous rectifiers. This control logic generates signals for controlling the rectifiers, and these signals are sent to a driving circuit that amplifies the signals to drive the synchronous rectifiers directly.

Figure 9A:
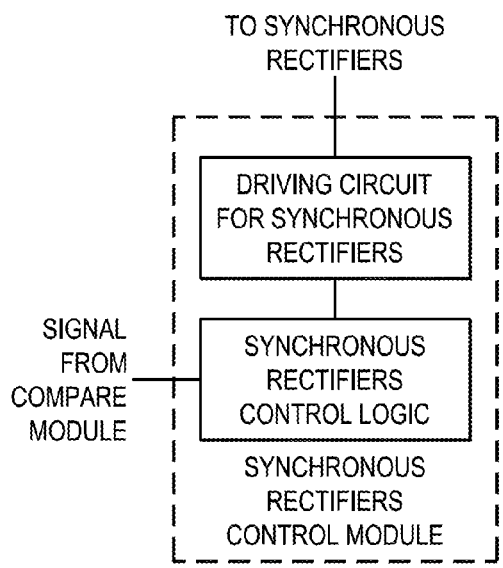
FIGS. 9A-9B illustrate two control diagrams of a synchronous rectifiers control module in accordance with example embodiments of the present disclosure.
Figure 9B:
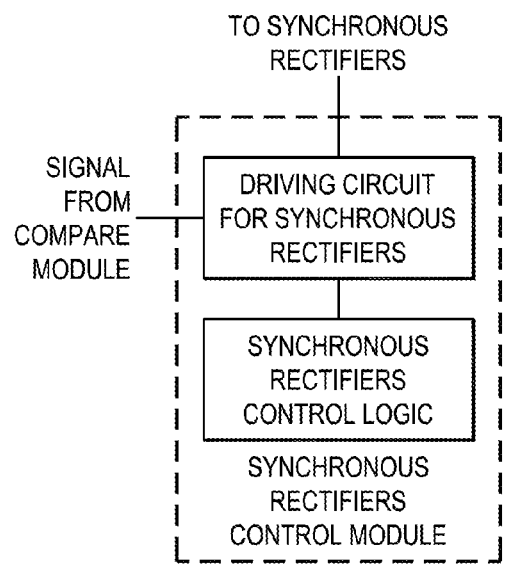

FIGS. 9A-9B illustrate two control diagrams of an SR control module 212. The difference between FIG. 9A and FIG. 9B is which block receives the signal sent from the compare module 216, 226. In FIG. 9A, the signal from the compare module 216, 226 is sent to the control logic so that this logic circuit can be notified to stop outputting the signals to the driving circuit. In FIG. 9B, the driving circuit for the synchronous rectifiers receives a signal from the compare module 216, 226. The synchronous rectifiers control logic still outputs the notifications, and the driving circuit can be notified to stop outputting the driving signals for the synchronous rectifiers. In either embodiment of FIG. 9, there may be an isolated unit (not shown) between the compare module and the SR control module.

Figure 10:
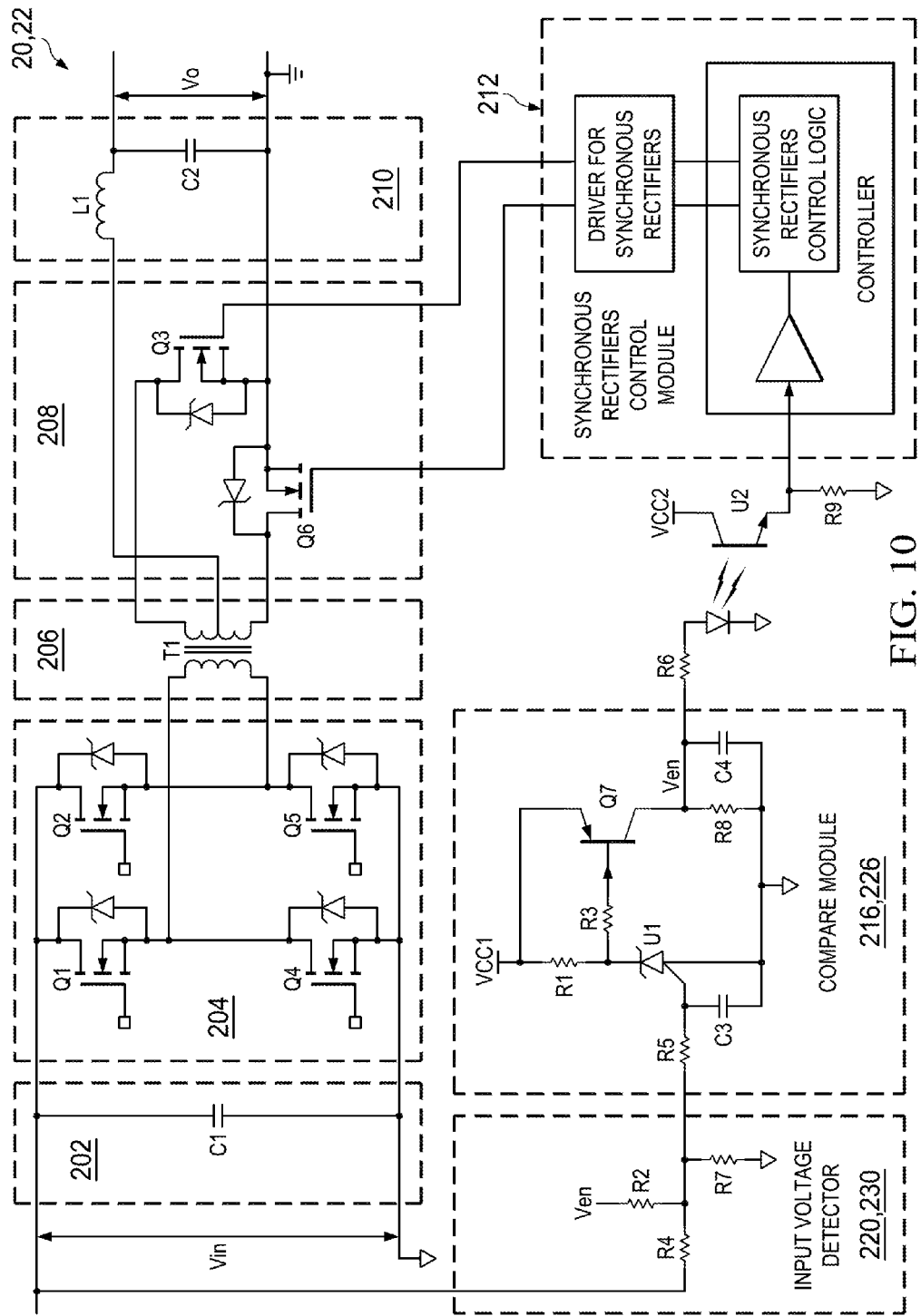
FIG. 10 illustrates a switching power supply employing the reverse current control module in accordance with one example embodiment of the present disclosure.

FIG. 10 illustrates a detailed embodiment of a switching power supply 20, 22 employing the reverse current control module 214, 224. In the embodiment shown in FIG. 10, the input filter 202 includes a capacitor C1 connected across $V_{in}$ and a reference, such as ground. The input filter 202 outputs to the primary switches 204, which include switches Q1, Q2, Q4, and Q5. Ends of switches Q1 and Q2 connect to the output of input filter 202. The other end of switch Q1 is connected to an end of switch Q4 and one end of a primary side of transformer T1 (206). The other end of switch Q2 is connected to an end of switch Q5 and the other end of the primary side of transformer T1. The other ends of switches Q4 and Q5 connect to the primary side reference.

The secondary side of transformer T1 connects to the synchronous rectifiers 208. The synchronous rectifiers 208 include switches Q3 and Q6. One terminal of switch Q3 is connected to one end of the secondary side of transformer T1, and one terminal of switch Q6 connects to the other end of the secondary side of transformer T1. Both switches Q3 and Q6 receive an input at their gates from the SR control module 212. The other terminals of switches Q3 and Q6 connect to ground.

A tap on the secondary side of transformer T1 connects to one terminal of an inductor L1 in output filter 210. The other end connects to the output node, as well as capacitor C2. The other terminal of capacitor C2 is grounded.

The threshold for the compare module 216, 226 is a predetermined value and is an internal reference applied to adjustable precision shunt regulator U1. During normal operation, energy is delivered from input $V_{in}$ to output $V_o$. The primary switches 204, including switches Q1, Q2, Q4, and Q5, and synchronous rectifiers 208, including switches Q3 and Q6, are all controlled by a controller via a control circuit (not shown). The input voltage $V_{in}$ is sensed by the input voltage detector 220, 230. As shown in FIG. 10, a voltage proportional to the input voltage $V_{in}$ is applied at the reference pin of shunt regulator U1. The proportion is derived from a resistor network formed from R2, R4, R7, and R8.

When the voltage across the reference pin of shunt regulator U1 is higher than the internal reference voltage, the cathode of shunt regulator U1 is pushed to a low voltage level. That low cathode voltage leads to the saturation of transistor Q7 and the application of the external direct current (DC) voltage VCC1 to the opto-coupler U2. This applied voltage drives the photodiode of opto-coupler U2. Hence, the transistor of opto-coupler U2 on the secondary side conducts, and another DC voltage VCC2 is applied across resistor R9. The controller detects the voltage level across the resistor R9 and runs in normal operation when this voltage level is high.

When the input voltage $V_{in}$ dips, the voltage across the reference pin of shunt regulator U1 also decreases. Once the voltage across that reference pin is lower than the internal reference of shunt regulator U1, the cathode pin of shunt regulator U1 is changed to a high resistance status, resulting in the turning off of transistor Q7. As a result, the DC voltages VCC1 and VCC2 are prevented from providing a voltage to opto-coupler U2. Therefore, the voltage across resistor R9 may decrease to a low level, since there is no energy provided by VCC2.

As mentioned above, the controller detects the voltage level change across resistor R9 and notifies the internal synchronous rectifiers control logic to disable the output of signals for the synchronous rectifiers to prevent the reverse current from flowing from the output to the input.

Figure 11:
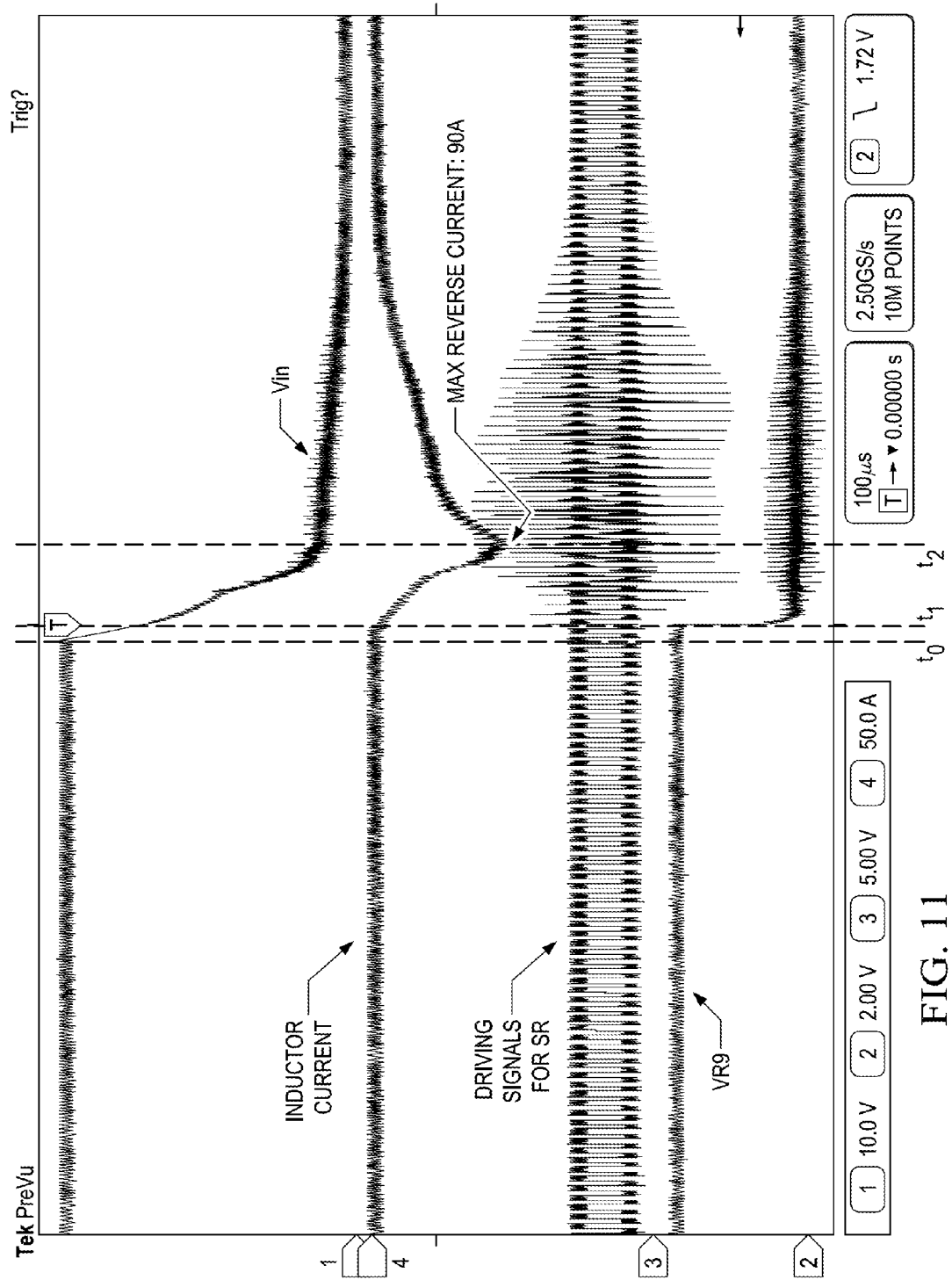
FIG. 11 illustrates waveforms of input terminals short-circuited without the reverse current control module in accordance with one example embodiment of the present disclosure.

FIG. 11 illustrates waveforms when the input terminals are short-circuited without the reverse current control module. The input terminals are shorted suddenly at time $t_0$, then the input voltage $V_{in}$ (trace 1) decreases sharply and becomes lower than the pre-set threshold at $t_1$, and the voltage across resistor R9 (trace 2, as well as VR9) also reduces to a lower level. However, there is no corresponding action for this voltage level change. Accordingly, the reverse current flowing in inductor L1 (trace 4) continues to increase and can be up to 90 Amperes at $t_2$.

Figure 12:
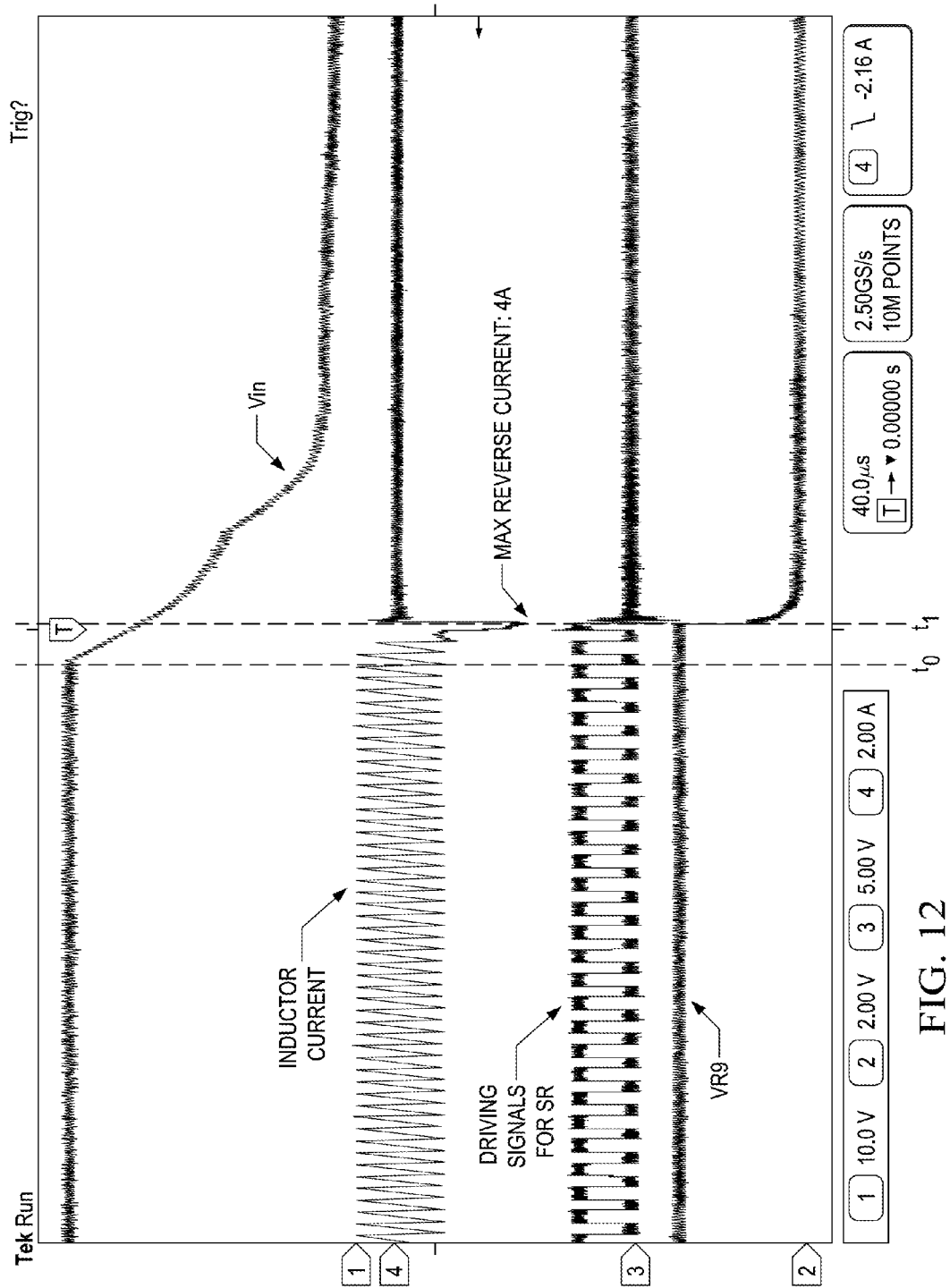
FIG. 12 illustrates waveforms of input terminals short-circuited with the reverse current control module in accordance with one example embodiment of the present disclosure.

FIG. 12 illustrates waveforms when the input terminals are short-circuited, using the same test conditions as above, but with the addition of a reverse current control module 214, 224. The input terminals are shorted suddenly at $t_0$, then the input voltage $V_{in}$ (trace 1) decreases sharply and becomes lower than the pre-set threshold at $t_1$, and the voltage across resistor R9 (trace 2, as well as VR9) also reduces to a lower level. The controller detects this voltage level change and disables output of the driving signals for the synchronous rectifiers immediately (trace 3). The waveform illustrates that the reverse current can be prevented immediately, and the observed max reverse current is only 4 Amperes.

In the discussions of the embodiments above, the transformers, switches, IGBTs, MOSFETs, operational amplifiers, analog-to-digital converters, resistors, capacitors, inductors, diodes, transistors, and opto-couplers can readily be replaced, substituted, or otherwise modified in order to accommodate particular circuitry needs. Moreover, complementary electronic devices, hardware, software, etc. are an equally viable option for implementing the teachings of the present disclosure.

In one example embodiment, any number of electrical circuits of the FIGURES may be implemented on a motherboard of an associated electronic device. The motherboard can be a general circuit board that can hold various components of the internal electronic system of the electronic device and, further, provide connectors for other peripherals. More specifically, the motherboard can provide the electrical connections by which the other components of the system can communicate electrically. Any suitable processors (inclusive of digital signal processors, microprocessors, supporting chipsets, etc.), memory elements, etc. can be suitably coupled to the motherboard based on particular configuration needs, processing demands, computer designs, etc. Other components such as external storage, additional sensors, controllers for audio/video display, and peripheral devices be attached to the motherboard as plug-in cards, via cables, or integrated into the motherboard itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Particular embodiments of the present disclosure may be readily included in a system on chip (SOC) package, either in part or in whole. An SOC represents an IC that integrates components of a computer or other electronic system into a single chip. It can contain digital, analog, mixed-signal, and often radio frequency functions, all of which can be provided on a single chip substrate. Other embodiments may include a multi-chip-module (MCM), with a plurality of separate ICs located within a single electronic package and configured to interact closely with each other through the electronic package. In various other embodiments, the amplification functionalities are implemented in one or more silicon cores in Application Specific Integrated Circuits (ASICs), Field Programmable Gate Arrays (FPGAs), and other semiconductor chips.

The specifications, dimensions, and relationships outlined herein (e.g., the number of processors and memory elements, logic operations, etc.) have only been offered for purposes of example and teaching only. Such information can be varied considerably without departing from the spirit of the present disclosure or the scope of the appended claims. The specifications apply only to one non-limiting example and, accordingly, should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

With the numerous examples provided herein, interaction may be described in terms of two, three, four, or more electrical components. However, this has been done for purposes of clarity and example only. It should be appreciated the system can be consolidated in any suitable manner. Along similar design alternatives, any of the illustrated components, modules, and elements of the FIGURES can be combined in various possible configurations, all of which are clearly within the broad scope of this disclosure. In certain cases, it may be easier to describe one or more of the functionalities of a given set of flows by only referencing a limited number of electrical elements. The electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

References to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art, and the present disclosure encompass all such changes, substitutions, variations, alterations, and modifications as falling within the scope of the appended claims. To assist the United States Patent and Trademark Office (USPTO) and, additionally, any readers of any patent issued on this application in interpreting the claims appended hereto, Applicant wishes to note the Applicant: (a) does not intend any of the appended claims to invoke 35 U.S.C. section 112(f) as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A power supply, comprising:
 a synchronous rectifier that rectifies an AC voltage to a DC voltage;
 a reverse current control module configured to generate a signal when an input voltage is lower than a threshold, the reverse current control module including a transistor and a shunt regulator, wherein, when a voltage across a reference pin of the shunt regulator is lower than an internal reference voltage of the shunt regulator, a cathode of the shunt regulator is changed to a high resistance status, resulting in the turning off of the transistor; and
 a control module that turns off the synchronous rectifier, after receiving the signal from the reverse current control module.

2. The power supply of claim 1, further comprising:
 an input power source that provides energy to a load, and
 an input filter that decouples a ripple interference from the input power source.

3. The power supply of claim 1, further comprising:
 a switch located on a primary side to invert an input DC voltage into an AC voltage.

4. The power supply of claim 1, further comprising:
 a transformer that isolates an input and an output.

5. The power supply of claim 1, further comprising:
 an output filter that smooths a DC voltage rectified by the synchronous rectifier.

6. The power supply of claim 1, wherein the reverse current control module senses an input voltage on a primary side and an output voltage on a secondary side.

7. The power supply of claim 1, wherein the reverse current control module includes an input voltage detector, an output voltage detector, and a compare module configured to compare one or more voltages.

8. The power supply of claim 7, wherein the input voltage detector includes
 an input for an input voltage sensing and
 an output coupled to the compare module.

9. The power supply of claim 7, wherein the output voltage detector includes
 an input for an output voltage sensing and
 an output coupled to the compare module.

10. The power supply of claim 7, wherein the compare module includes two inputs from the input voltage detector and the output voltage detector, and the compare module is configured to calculate a threshold based on an output voltage and at least one other parameter.

11. The power supply of claim 1, wherein an input voltage detector senses a voltage on both a primary side and a secondary side that reflects the input voltage or that has relationship with the input voltage.

12. The power supply of claim 1, further comprising:
 a compare module configured to perform a compensation for both the input voltage and an output voltage to calculate a correct input and output voltage value.

13. The power supply of claim 1, further comprising:
 a compare module that calculates a voltage threshold dynamically or sets the threshold as a predetermined value.

14. The power supply of claim 1, further comprising:
 a first block that decouples noise, and
 a second block that attains a certain delay time, wherein at least some portions of the power supply maintain an input signal and an output signal for a predetermined time.

15. The power supply of claim 1, wherein the control module is configured to disable one or more driving signals for the synchronous rectifier.

16. The power supply of claim 1, wherein the reverse current control module and the control module are implemented as an analog circuit, a digital circuit, a hybrid circuit, or software executed in a memory or in conjunction with a processor.

17. The power supply of claim 1, further comprising:
 a compare module that senses the input voltage on a primary side.

18. The apparatus of claim 1, wherein, when the voltage across the reference pin of the shunt regulator is higher than the internal reference voltage of the shunt regulator, the cathode of the shunt regulator leads to a saturation of the transistor.

19. A method, comprising:
 sending a first signal from a reverse current control module to a control module when an input voltage is lower than a threshold, the reverse current control module including a transistor and a shunt regulator, wherein, when a voltage across a reference pin of the shunt regulator is lower than an internal reference voltage of the shunt regulator, a cathode of the shunt regulator is changed to a high resistance status, resulting in the turning off of the transistor; and
 sending a second signal from the control module to turn off a synchronous rectifier, in response to the first signal.

20. The method of claim 19, wherein the first signal is sent when an input voltage dips.

21. The method of claim 19, further comprising:
 sensing the input voltage on a primary side and an output voltage on a secondary side; and
 calculating the threshold based on at least the output voltage.

22. The method of claim 19, further comprising:
 compensating a voltage plateau to achieve a value for the input voltage.

23. A method implemented by a power supply, the method comprising:
 rectifying, with a synchronous rectifier, an AC voltage to a DC voltage;
 generating, with a reverse current control module, a signal when an input voltage is lower than a threshold, the reverse current control module including a transistor and a shunt regulator, wherein, when a voltage across a reference pin of the shunt regulator is lower than an internal reference voltage of the shunt regulator, a cathode of the shunt regulator is changed to a high resistance status, resulting in the turning off of the transistor; and
 turning off the synchronous rectifier, with a control module, after the control module receives the signal from the reverse current control module.

24. The method of claim 23, further comprising:
 sensing the input voltage on a primary side and an output voltage on a secondary side; and
 calculating the threshold based on at least the output voltage.

* * * * *